United States Patent [19]

Okouchi et al.

[11] Patent Number: 4,543,188
[45] Date of Patent: Sep. 24, 1985

[54] APPARATUS FOR REMOVING FOREIGN MATTERS FROM CONDENSER COOLING WATER

[75] Inventors: Isao Okouchi; Sankichi Takahashi, both of Hitachi; Kenkichi Izumi; Masahiko Miyai, both of Mito; Katsumoto Otake, Hitachi, all of Japan

[73] Assignee: Hitachi, Ltd., Tokyo, Japan

[21] Appl. No.: 548,506

[22] Filed: Nov. 3, 1983

[30] Foreign Application Priority Data

Nov. 5, 1982 [JP] Japan ................ 57-193326

[51] Int. Cl.$^4$ ............................... B01D 35/24
[52] U.S. Cl. .................... 210/304; 210/305; 210/312; 210/405; 210/422; 210/456
[58] Field of Search ............. 210/137, 304, 305, 312, 210/405, 409, 422, 423, 433.1, 456

[56] References Cited

U.S. PATENT DOCUMENTS

| 3,174,622 | 3/1965 | La Mort | 210/304 |
| 3,724,669 | 4/1973 | Thal | 210/409 |
| 3,789,992 | 2/1974 | Treplin et al. | 210/405 |
| 3,823,831 | 7/1974 | Le Blanc, Jr. | 210/409 |
| 3,828,930 | 8/1974 | Eimer et al. | 210/137 |
| 3,875,063 | 4/1975 | Treplin et al. | 210/456 |
| 4,108,778 | 8/1978 | Lambert et al. | 210/304 |
| 4,276,171 | 6/1981 | Jackson | 210/456 |
| 4,305,822 | 12/1981 | Eimer et al. | 210/405 |
| 4,311,591 | 1/1982 | Eimer et al. | 210/405 |
| 4,366,056 | 12/1982 | Jackson | 210/435 |

Primary Examiner—Richard V. Fisher
Assistant Examiner—Wanda L. Millard
Attorney, Agent, or Firm—Beall Law Offices

[57] ABSTRACT

A foreign matter removing apparatus for removing foreign matters from cooling water such as sea water taken as the cooling water for the condenser of, for example, a power generating plant. The apparatus has an inversed frusto-conical barrel, a filter of a substantially same form as the barrel and disposed in the latter, a cooling water inlet pipe connected to a side portion of the barrel, a cooling water outlet pipe connected to an upper portion of the barrel, a foreign matter discharge pipe connected to a lower side portion of the barrel, and a butterfly valve disposed in the cooling water inlet at which the cooling water inlet pipe is connected to the barrel. The foreign matter discharge pipe is periodically opened while varying the opening degree or angular position of the butterfly valve thereby to remove and discharge foreign matters from the filter surface. The filter is provided at an upper portion thereof with a cover plate or, alternatively, non-perforated portion which effectively enhances the foreign matter removing ratio while eliminating the clogging of the filter and reducing the pressure drop.

12 Claims, 7 Drawing Figures

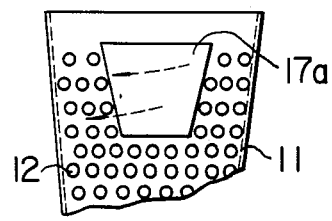
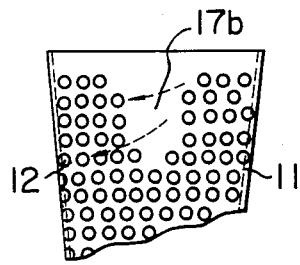
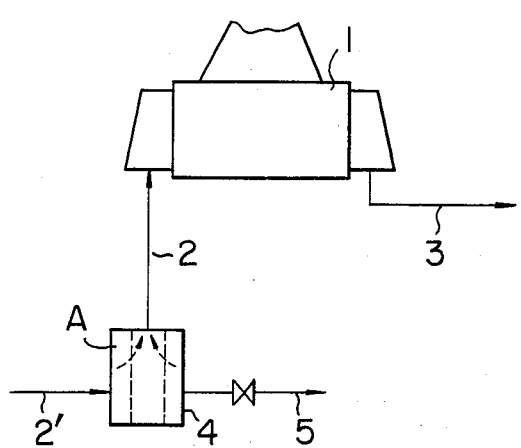
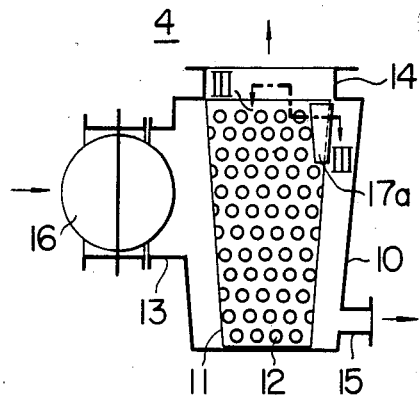
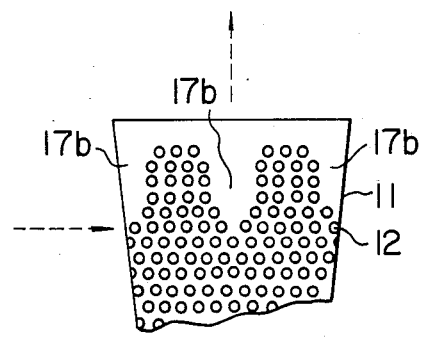
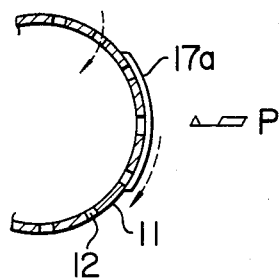
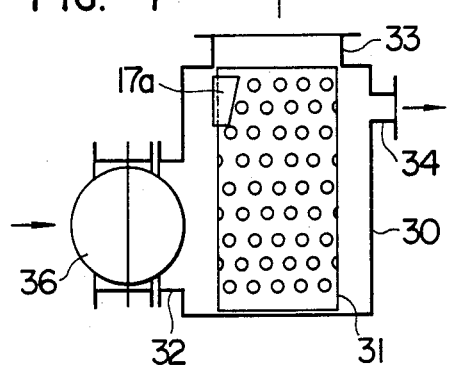

APPARATUS FOR REMOVING FOREIGN MATTERS FROM CONDENSER COOLING WATER

BACKGROUND OF THE INVENTION

The present invention relates to an apparatus for removing foreign matters from condenser cooling water and, more particularly, to an apparatus for removing foreign matters such as marine creatures from sea water which is taken as cooling water for cooling condenser, by effectively separating discharging such foreign matters by means of flow of water.

Power plants such as steam power plants or nuclear power plants which make use of sea water as the condenser cooling water usually have screens or the like disposed at the sea water intake to arrest and remove foreign matters from the sea water flowing into the condenser. The screen, however, cannot arrest tiny foreign matters such as larval forms of creatures and shellfishes. These larval forms attach to the wall of the sea water intake pipe and grow to form a heavy deposit. The creatures then die to come off from the pipe wall and the mass of dead creatures flow into the condenser to cause problems such as clogging of the cooling water tubes in the condenser. Hitherto, there has been no means for avoiding such a problem.

In recent years, there is an increasing demand for an apparatus which can remove the dead creatures or like foreign matters from the sea water before the same enters the condenser.

To cope with this demand, an apparatus as shown in FIG. 1 has been proposed in which the foreign matters are caught by a filter surface provided in a foreign matters removal apparatus 4 in the water inlet system 2 of the condenser 1 and are suitably discharged from the discharge system 5. In order to effectively catch such large foreign matters as cannot pass through the condenser cooling water pipe and to smoothly discharge the thus caught foreign matters, in the known foreign matter removing apparatus of the type mentioned above, the water inlet system is connected tangentially to the foreign matters removing apparatus so as to impart a swirling flow along the filter surface. It has been proposed also to wash and clean the filter surface by swirling flow or reverse swirling flow which takes place in accordance with the opening degree of a valve such as butterfly valve directly connected to the inlet system.

In general, however, it is required to minimize the rate of discharge from the discharging system 5 in relation to the rate of intake of water from the inlet system 2', in order to maintain a sufficiently large rate of water supply to the condenser. Therefore, when a swirling flow along the filter surface is generated for cleaning the filter surface, the flow velocity becomes higher at the portion of the filter surface adjacent to the outlet system 2 as indicated by an arrow A than at other portions of the same. In consequence, even though the swirling flow is formed, the foreign matters are concentrated to the portion of the filter surface adjacent to the outlet system 2 to cause a heavy clogging in that portion of the filter surface.

In consequence, the effective passage area of the filter is decreased to deteriorate the performance for removing the foreign matters. In addition, the flowing velocity of the sea water through the filter is increased to promote the tendency of clogging to further impair the performance of the foreign matter removing apparatus and to increase the loss of energy or pressure drop in the cooling water circulating system.

SUMMARY OF THE INVENTION

Accordingly, an object of the invention is to provide a foreign matter removing apparatus in which the foreign matters are caught and removed by a swirling flow to effectively prevent the clogging of the filter surface thereby to obviate the above-described problems of the prior art.

To this end, according to the invention, there is provided a foreign matter removing apparatus for condenser cooling water, adapted for removing foreign matters such as marine creatures from the cooling water before the cooling water flows into a condenser, characterized by comprising: an inversed frusto-conical (including cylindrical) barrel; a filter mounted in the barrel and having a form substantially same as that of the barrel; a cooling water inlet pipe connected to a side portion of the barrel; a cooling water outlet pipe connected to an upper portion of the barrel; a foreign matter discharge pipe connected to a lower side portion of the barrel; a butterfly valve disposed at the cooling water inlet of the cooling water inlet pipe; and a flow weakening means for weakening the flow of water directed to the portion in the filter where the spiral flow produced by the restricting effect of the butterfly valve tends to become weak; whereby the cooling water coming into the barrel past the butterfly valve is introduced into the annular passage between the inner peripheral surface of the barrel and the outer peripheral surface of the filter to form a downward spiral flow which separates foreign matters from the outer peripheral surface of the filter and discharges the same from the foreign matter discharge pipe.

BRIEF DESCRIPTION OF THE DRAWINGS

FIG. 1 is a diagram showing the flow of cooling water in a known condenser;

FIG. 2 is a vertical sectional view of a foreign matter removing apparatus in accordance with the invention;

FIG. 3 is a sectional view taken along the line III—III of FIG. 2;

FIG. 4 is a partial enlarged view of the apparatus as viewed in the direction of an arrow P in FIG. 3;

FIG. 5 shows in a larger scale in another embodiment in which a cover plate shown in FIG. 4 is omitted and, insteadly, the passage holes under the cover plate shown in FIG. 4 are closed;

FIG. 6 shows in a larger scale still another embodiment in which, insteadly of disposing a cover plate over the entire periphery of the filter at a predetermined distance therefrom, the passage holes under the cover plate in FIG. 4 are omitted; and FIG. 7 is a sectional view of another embodiment of the invention.

DESCRIPTION OF THE PREFERRED EMBODIMENT

A preferred embodiment of the invention will be described hereinunder with reference to the accompanying drawings.

Referring to FIG. 2, an inversed frusto-conical (including cylindrical) filter 11 is mounted in an inversed frusto-conical (including cylindrical) barrel 10 so that an annular flow passage is formed between the inner peripheral surface of the barrel 10 and the outer peripheral surface of the filter 11. An inlet pipe 13 is connected to a portion of the side surface of the barrel 10. An outlet pipe 14 is connected to an upper portion of the barrel 10, while a discharge pipe 15 is connected to a lower side portion of the barrel 10. A butterfly valve 16 is connected to the inlet pipe 13. A reference numeral 17a designates a cover plate provided at the upper end of the filter 11.

Most of the cooling water coming from the inlet pipe 13 flows out through the outlet pipe 14 past the filter 11.

During the operation, various foreign matters attach to the portion near the outlet pipe 14 to form deposit. When the deposit becomes heavy to hinder the operation of the filter, the butterfly valve 16 is operated to alter the flowing direction of the incoming cooling water such that the cooling water flows along the annular path. The cooling water flowing through the annular passage forms a spiral flow along the inner peripheral surface of the inversed frusto-conical barrel 10 towards the discharge port 15. The outer surface of the filter 11 is cleaned by this spiral flow and the foreign matters which have come off from the filter 11 are discharged from the discharge port 15.

To explain in more detail, referring to FIG. 2, the barrel 10 has an inversed frusto-conical form with the diameter of cross-section thereof decreasing along the axis from the upper side to the lower side. A filter 11 which also has an inversed frusto-conical form and provided with a multiplicity of passage holes 12 is mounted in the barrel 10. The inlet pipe 16 and the outlet pipe 14 are connected to a side portion and an upper portion of the barrel 10, respectively. The butterfly valve 13 is connected to the inlet pipe 13 and is carried by a rotary shaft the axis of which extends in parallel with the axis of the barrel 10. A cover plate 17a is disposed at the upper side of the filter 11. In this embodiment, as shown in FIGS. 3 and 4, the cover plate 17a is mounted in such a manner as to close a part of the passage holes 12 formed in the portion of the upper part of the filter 11 opposite to the water inlet portion. This arrangement is adopted because, in the portion opposite to the inlet portion, the flow of water is not so strong and, hence, the foreign matters can hardly be removed.

FIG. 5 shows another embodiment in which, insteadly of forming the cover plate 17a as shown in FIGS. 2 to 4, the portion corresponding to the cover plate 17a is devoid of the passage hole 12 to constitute a non-perforated portion 17b.

FIG. 6 shows still another embodiment which is discriminated from the embodiments shown in FIGS. 2 to 5 in that a plurality of non-perforated portions 17b are formed in the upper portion of the filter 11 as if a plurality of cover plates 17a are attached to the upper portion of the filter 11 at a predetermined circumferential pitch over the entire periphery of the filter 11. Thus, the perforated portions having the passage holes 12 and non-perforated portions devoid of passage holes 12 continue alternatingly in the circumferential direction of the filter in the form of successive mountains and valleys.

By providing the cover plate 17a or the non-perforated portions 17b, it is possible to make the cooling water avert from the upper portion of the filter having large diameter where the flow of water is rather small and weak and, hence, the deposit of foreign matters can hardly be removed. In consequence, according to the invention, it is possible to attain a high rate of removal of the foreign matters.

The operation of the apparatus in accordance with the invention will be explained hereinunder with reference to the drawings.

Referring to FIG. 2, the cooling water coming through the inlet pipe 13 past the butterfly valve 16 is made to flow through the passage holes 12 formed in the filter. Most part of the cooling water which has come into the filter 11 flows out through the outlet pipe 14 and forwarded to the condenser. Meanwhile, the foreign matters suspended by the cooling water are made to attach to the surface of the filter 11 to form a deposit. The deposit first appears on the upper portion of the filter 11 where the highest flow velocity of cooling water is obtained and then gradually spreads to the lower part of the filter 11. The amount of deposit of the foreign matters on the filter can be known from the pressure drop across the foreign matter removing apparatus.

At each time a predetermined amount of deposit is formed, e.g. once a day, the discharge port 15 is opened and the butterfly valve 16 is operated to alter the direction of flow of the cooling water such that the cooling water flows through the annular passage formed between the inner peripheral surface of the barrel 10 and the cover plate 17a or the non-perforated portion 17b of the filter 11. In this state, the cooling water coming into the annular passage is guided by the inner peripheral surface of the inversed frusto-conical barrel 10 to form a downward spiral flow. This downward spiral flow of the cooling water strongly acts on the outer surface of the filter to separate the foreign matters from the filter surface and conveys the same downwardly, so that the foreign matters are efficiently discharged through the discharge port 15 together with the water. By changing the direction or opening angle of the butterfly valve 16, the direction of the spiral flow of water around the filter 11 is reversed so that the effect of separation of the foreign matters from the filter surface is enhanced advantageously.

An experiment was conducted to compare the effect of removal of the foreign matters between the first case where the cover plate 17a is mounted as shown in FIGS. 2 to 4 and a second case where the cover plate 17a is omitted. The result of this experiment is shown below.

| (a) When the cover plate 17a is provided: | |
|---|---|
| amount of foreign matters put into cooling water: | 270 |
| amount of foreign matters collected: | 265 |
| removal ratio: | 98% |
| (b) When the cover plate 17a is not provided: | |
| amount of foreign matters put into the cooling water: | 270 |
| amount of foreign matters collected: | 247 |
| removal ratio: | 91% |

In both cases (a) and (b), the flow velocity of the cooling water in the inlet pipe was selected to be 2 m/sec.

From the result of this experiment, it is understood that the efficiency of removal of the foreign matters can be increased remarkably by the provision of the cover plate 17a.

FIG. 7 shows another embodiment of the invention. This embodiment is discriminated from the first embodiment shown in FIGS. 2 to 6 by the following features. Namely, in this embodiment, an inlet pipe 32 and a discharge pipe 34 are connected to a lower portion and an upper portion of the side surface of the barrel 30, respectively, and an outlet pipe 33 is connected to an upper portion of the barrel 30. The barrel 30 has a cylindrical (including inversed frusto-conical) form and receives a filter 31 which also has a form substantially same as that of the barrel 30. A cover plate 17a is provided on the same side of the filter 31 as the outlet pipe 33. To compensate for the reduction of the total passage area due to the closing of some of the passage holes by the cover plate 17a, additional passage holes of a total area equal to the area lost by the covering by the cover plate 17a are formed in other suitable portions of the filter 31 or, alternatively, some of the passage holes are enlarged to provide an additional total area amounting to the lost area. In this embodiment, since the spiral flow generated as a result of the inclination of the butterfly valve 36 is naturally directed upwardly towards the discharge pipe 34, it is effective to dispose the cover plate 17a on the portion of the filter remote from the discharge pipe 34 in the upper part of the filter to which the water flows along the longest path than other part. As will be seen from FIGS. 3 to 6, in the portion of the surface of the filter adjacent to the outlet pipe 33, the flow of water is comparatively strong because the water is induced into the outlet pipe. Therefore, the flow surface 17b as shown in FIGS. 5 and 6 is formed to enhance the effect of the spiral flow of water on the foreign matters so that the foreign matters sticking to the filter surface is removed and discharged efficiently through the discharge pipe 34.

It is thus possible to partially and adequately alter the action of the spiral water flow by providing the cover plate 17a or the flow surface 17b in the portion of the filter where the deposit of the foreign matters is more liable to be formed than in other portions, thereby to promote the separation of the foreign matters and to enhance the rate of removal of the foreign matters.

As has been described, according to the invention, there is provided a foreign matter removing apparatus for condenser cooling water, having a substantially cylindrical barrel accomodating a substantially cylindrical filter, a cover plate or a non-perforated area provided at upper portion of the filter so as to form an annular passage between the cover plate or the non-perforated area and the inner peripheral surface of the barrel, and a butterfly valve adapted to alter the direction of flow of the water in the annular passage. In operation, as the discharge port formed in the lower portion of the barrel is opened, the water coming into the annular passage forms a downward spiral flow which effectively separates the foreign matters from the filter surface and conveys the same downwardly. In addition, since the cover plate is disposed to weaken the flow of the water directed to the portion in the filter where the spiral flow tends to become weak, the foreign matters are efficiently discharged through the discharge port.

Consequently, the clogging of the filter is avoided to decrease the pressure drop across the filter and, hence, to ensure a high performance of the foreign matter removing apparatus. This in turn assures that the associated equipment such as condenser can operate with its full ability without the fear of contamination by foreign matters, and offers various other advantages.

What is claimed is:

1. A foreign matter removing apparatus for a condenser cooling water comprising:
   a generally cylindrical barrel,
   a filter mounted in said barrel, said filter having an upper and lower portion,
   an unfiltered cooling water inlet pipe connected to a side portion of said barrel,
   a filtered cooling water outlet pipe connected to an upper portion of said barrel,
   a foreign matter discharge pipe connected to a side portion of said barrel,
   a butterfly valve disposed in said unfiltered cooling water inlet pipe for adjusting the flow of water into said barrel to either directly flow into said barrel for filtering or to tangentially flow into said barrel for filter cleaning, and
   flow blocking means on an upper portion of said filter opposite said cooling water inlet.

2. A foreign matter removing apparatus according to claim 1, wherein said flow blocking means comprises a non-perforated portion of said filter.

3. A foreign matter removing apparatus according to claim 1, wherein said flow blocking means comprises a cover plate.

4. A foreign matter removing apparatus according to claim 1, wherein said flow blocking means is provided by said filter which is provided at its upper portion with a plurality of flow blocking portions equally spaced around the entire periphery thereof.

5. A foreign matter removing apparatus for condenser cooling water comprising:
   an inverted frusto-conical barrel,
   a filter mounted in said barrel and having a form substantially the same as that of said barrel and further having an upper and lower portion,
   an unfiltered cooling water inlet pipe connected to a side portion of said barrel,
   a filtered cooling water outlet pipe connected to an upper portion of said barrel,
   a foreign matter discharge pipe connected to a side portion of said barrel,
   a butterfly valve disposed in said unfiltered cooling water inlet pipe for adjusting the flow of water into said barrel to either directly flow into said barrel for filtering or to tangentially flow into an annular passage between the inner peripheral surface of said barrel and the outer peripheral surface of said filter to form a downward spiral flow which separates foreign matters from the outer peripheral surface of said filter and discharges the same from said foreign matter discharge pipe, and
   flow blocking means on an upper portion of said filter opposite said cooling water inlet.

6. A foreign matter removing apparatus according to claim 5, wherein said flow blocking means comprises a non-perforated portion of said filter.

7. A foreign matter removing apparatus according to claim 5, wherein said flow blocking means comprises a cover plate.

8. A foreign matter removing apparatus according to claim 5, wherein said flow blocking means is provided by said filter which is provided at its upper portion with a plurality of flow blocking portions equally spaced around the entire periphery thereof.

9. A foreign matter removing apparatus for a condensor cooling water comprising:
   a generally cylindrical barrel, a filter mounted in said barrel, said filter having an upper and lower portion, an unfiltered cooling water inlet pipe connected to a lower side portion of said barrel, a filtered cooling water outlet pipe connected to an upper portion of said barrel, a foreign matter discharge pipe connected to an upper side portion of said barrel opposite said inlet, a butterfly valve disposed in said unfiltered cooling water inlet pipe for adjusting the flow of water into said barrel to either directly flow into said barrel for filtering or to tangentially flow into said barrel for filter cleaning, and flow blocking means opposite said discharge pipe only on an upper side portion of said filter.

10. A foreign matter removing apparatus according to claim 9, wherein said flow blocking means comprises a non-perforated portion of said filter.

11. A foreign matter removing apparatus according to claim 9, wherein said flow blocking means comprises a cover plate.

12. A foreign matter removing apparatus according to claim 9, wherein said flow blocking means is provided by said filter which is provided at its upper portion with a plurality of flow blocking portions equally spaced around the entire periphery thereof.

* * * * *